United States Patent [19]
Curtis

[11] Patent Number: 6,052,264
[45] Date of Patent: Apr. 18, 2000

[54] METHOD AND APPARATUS FOR PREDICTING CAPSTAN SLIP IN TAPE DRIVES UTILIZING BELT-DRIVEN TAPE CARTRIDGES

[75] Inventor: Lance Williamson Curtis, Tucson, Ariz.

[73] Assignee: International Business Machines Corporation, Armonk, N.Y.

[21] Appl. No.: 08/993,930

[22] Filed: Dec. 18, 1997

[51] Int. Cl.[7] ....................................................... G11B 5/76
[52] U.S. Cl. .......................... 360/137; 360/71; 360/73.04; 360/73.09; 242/340; 242/341; 242/352.4
[58] Field of Search .................................. 360/73.09, 71, 360/73.04, 137; 242/340, 341, 352.4, 334.3, 334, 334.4, 413.9

[56] References Cited

U.S. PATENT DOCUMENTS

| | | |
|---|---|---|
| 3,320,600 | 5/1967 | Headrick et al. . |
| 3,586,259 | 6/1971 | Richt . |
| 3,725,655 | 4/1973 | Edstrom et al. . |
| 3,805,286 | 4/1974 | Kavanagh et al. . |
| 4,442,985 | 4/1984 | Kishi et al. . |
| 4,553,182 | 11/1985 | Narita . |
| 5,850,316 | 12/1998 | Sato et al. ................................. 360/93 |

FOREIGN PATENT DOCUMENTS 2 098 364  11/1982  United Kingdom .

*Primary Examiner*—Aristotelis M. Psitos
*Assistant Examiner*—Dan I. Davidson
*Attorney, Agent, or Firm*—Altera Law Group, LLC

[57] ABSTRACT

A method and apparatus is disclosed for predicting capstan slipping in belt-driven tape cartridges. The method predicts the occurrence of capstan slip conditions between the belt capstan of a belt-driven tape cartridge and the rotating elastomeric drive roller of the tape drive. To predict capstan slip conditions, the method determines a critical velocity value corresponding to a critical slip condition based on a relationship between the drive force which rotates the cartridge belt capstan, and on the normal force of the drive roller against the cartridge belt capstan. A threshold velocity value corresponding to the drive and normal forces is selected at a point where the relationship between the drive and normal forces would not yet encounter the critical slip condition. The steady-state tape velocity is monitored during operation of the tape cartridge in the tape drive, and an imminent capstan slip indication is provided when the steady-state tape velocity reaches the threshold velocity value.

29 Claims, 9 Drawing Sheets

METHOD AND APPARATUS FOR PREDICTING CAPSTAN SLIP IN TAPE DRIVES UTILIZING BELT-DRIVEN TAPE CARTRIDGES

BACKGROUND OF THE INVENTION

1. Field of the Invention

The present invention relates generally to tape drive systems. More particularly, the present invention relates to a system and method for predicting capstan slip conditions using the steady-state tape velocity corresponding to normal forces and drive forces at risk of slip in tape systems utilizing belt-driven tape cartridges.

2. Description of Related Art

Magnetic tape recording is used in a multitude of applications, ranging from audio and video recording to digital information recording. Computer systems utilize magnetic tape recording for a variety of purposes, including high-density data backup, on-line storage, archiving, versioning, multimedia edit and playback, Internet downloading, and application storage. Magnetically recorded tape cartridges are often used for the convenience of portability. The high storage capacities of today's tape cartridges provide advantages over other portable storage media, such as floppy disks, particularly due to the greatly increased size of software packages, graphics files, and the like.

Various types of tape cartridges exist, depending largely on the environment in which it is to be used. Typical audio tape cartridges, or cassettes, are relatively simple in their design, but are not capable of operating at high speeds with very high information densities. On the other hand, larger, more sophisticated tape cartridges can be used for data-intensive purposes, such as high-speed computer backups. One such tape cartridge is the quarter-inch cartridge (QIC). QIC technology involves methods of storing and managing information using QIC drives and media. This type of tape cartridge utilizes a belt-driven tape feed mechanism, and provides more precise read/write head alignment and managed tape tension and control. Indicia on the tape can be used to provide information to the tape drive during operation.

While magnetic tape cartridges remain popular, they are not without drawbacks. Digital information such as a program file is particularly sensitive to data loss, as the loss of any bits may be critical. Tape cartridges incorporate a great deal of mechanical technology, but mechanical parts can become defective over time or due to manufacturing defects. For example, tape drives move the tape in belt-driven tape cartridges past the read/write head by way of turning the tape reels with an elastomeric drive belt within the tape cartridge. The drive belt moves as a cartridge wheel turns, which is pressed against a rotating drive roller having elastomeric properties. If the friction between the cartridge wheel and the drive roller is not great enough, the drive roller can slip and spin against the cartridge wheel without moving the tape. When this occurs, the elastomeric material on the drive roller wears in an uneven fashion, which can lead to a failure of the tape drive. The cartridge wheel can also wear unevenly in such an instance, which can destroy the cartridge and result in data loss.

Due to the potential for mechanical malfunctions of tape cartridges, it would be advantageous to detect capstan slippage to notify the user of the problem as soon as possible. Prior art systems have attempted to detect actual capstan slip by monitoring for an abrupt change in tape velocity. However, these systems are only capable of determining a change in velocity of the tape at a particular time, and do not take into account normal velocity variations that are characteristic of belt-driven tape cartridges that have elastomeric properties in the drive roller and drive belt. Further, monitoring for a velocity change over a very short distance of the tape is actually tantamount to monitoring for actual capstan slipping. The prior art "detects" capstan slip by measuring the change in the tape velocity, where a "change" of a certain degree would indicate that the tape/capstan relationship has entered into a sliding friction zone, i.e., that slipping is occurring. However, capstan "slip detection" of this type does not intervene at a time prior to the potentially catastrophic slip condition, as the damage may have already occurred when the capstan slip is detected.

It is therefore desirable to "predict" capstan slip. One prior art system, described in U.S. Pat. No. 3,320,600, issued on May 16, 1967 to Headrick et al., provides a circuit which attempts to detect a forthcoming failure in capstan operation on a tape drive. Headrick et al. describes a system for determining a tape speed ratio by recording two indications in sequence with a particular time spacing. It measures a time interval between two inserted indications on the tape during writing, and compares it to a time between the two inserted indications during reading to calculate a change in instantaneous velocity. However, Headrick et al. does not predict capstan slip as in the present invention, but rather focuses on the failure of capstan operation itself, i.e., "capstan acceleration or deceleration response". Therefore, Headrick et al. does not determine whether slipping may occur due to varying force factors between the tape drive and the tape itself. Further, Headrick et al. is directed to a change in velocity based on tape length variables, which may not correspond to capstan slip, particularly in belt-driven tape cartridge systems.

Therefore, a method for predicting a capstan slip situation for belt-driven tape cartridges using the steady-state velocity, rather than a sudden deviation in tape velocity, is desired. The elastomeric properties of belt-driven tape cartridges naturally cause some velocity variations which are independent of capstan slip. Prior art systems which monitor a change in velocity may trigger capstan slip errors in cases where the change in velocity is normal due to normal velocity variations of belt-driven tape cartridges. It would also be advantageous to provide continuous prediction of potential capstan slip situations, rather than only during periods of tape acceleration or deceleration. The present invention overcomes these and other shortcomings, and provides additional advantages over the prior art.

SUMMARY OF THE INVENTION

To overcome the limitations in the prior art described above, and to overcome other limitations that will become apparent upon reading and understanding the present specification, the present invention discloses a method and apparatus for predicting capstan slip conditions affecting the belt capstan of a belt-driven tape cartridge.

The present invention solves the above-described problems by providing a method and apparatus that predicts the occurrence of capstan slip conditions between the belt capstan of a belt-driven tape cartridge and the rotating elastomeric drive roller of the tape drive. Furthermore, a test cartridge is provided to ascertain whether an imminent capstan slip indication is the result of a tape drive or a tape cartridge problem.

A method in accordance with the principles of the present invention includes the steps of determining a critical velocity value corresponding to a critical slip condition based on a relationship between the drive force which rotates the cartridge belt capstan, and on the normal force of the drive roller against the cartridge belt capstan. A threshold velocity value corresponding to the drive and normal forces is selected at a point where the relationship between the drive and normal forces would not yet encounter the critical slip condition. The steady-state tape velocity is monitored during operation of the tape cartridge in the tape drive, and an imminent capstan slip indication is provided when the steady-state tape velocity reaches the threshold velocity value. In this manner, the imminent capstan slip indication is provided prior to occurrence of the critical slip condition.

Other embodiments of a method in accordance with the principles of the invention may include alternative or optional additional aspects. One such aspect of the present invention is that the step of monitoring the steady-state tape velocity includes measuring the steady-state tape velocity when the drive roller and the belt capstan maintain a rolling friction therebetween, and where the step of providing an imminent capstan slip indication includes providing the imminent capstan slip indication when the steady-state tape velocity is within a predetermined velocity margin of a sliding friction band, so that the drive roller and the belt capstan continue to maintain a rolling friction therebetween. Another such aspect is that the steady-state tape velocity is continually monitored, by providing servo tracks along the tape, where each of the servo tracks includes a pre-recorded servo pattern having a plurality of servo cycles separated at known distances. The time interval between predetermined servo cycles is monitored, and the steady-state tape velocity is calculated based on the time interval and the known distance between the predetermined servo cycles.

In accordance with another embodiment of the invention, a tape drive for predicting capstan slip conditions during operation of a belt-driven tape cartridge is provided. The tape cartridge includes a rotatable belt capstan to impart motion to an elastomeric belt which moves the tape within the tape cartridge. A drive roller, coupled to a drive capstan which is rotated by a drive motor, has an elastomeric surface to engage the belt capstan, wherein a normal force of the drive roller against the belt capstan in view of an angular drive force of the belt capstan causes the belt capstan to rotate. A processor is configured to monitor a nominal tape velocity, and to provide an imminent capstan slip notification when the nominal tape velocity reaches a velocity threshold value corresponding to a relationship between the drive force and the normal force indicative of imminent, yet unencountered, capstan slip.

These and other features and advantages of the present invention will become readily apparent to those skilled in the art from the following detailed description and corresponding drawings. As will be realized, the invention is capable of modification without departing from the invention. Accordingly, the drawing and description are to be regarded as illustrative in nature, and not as restrictive.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
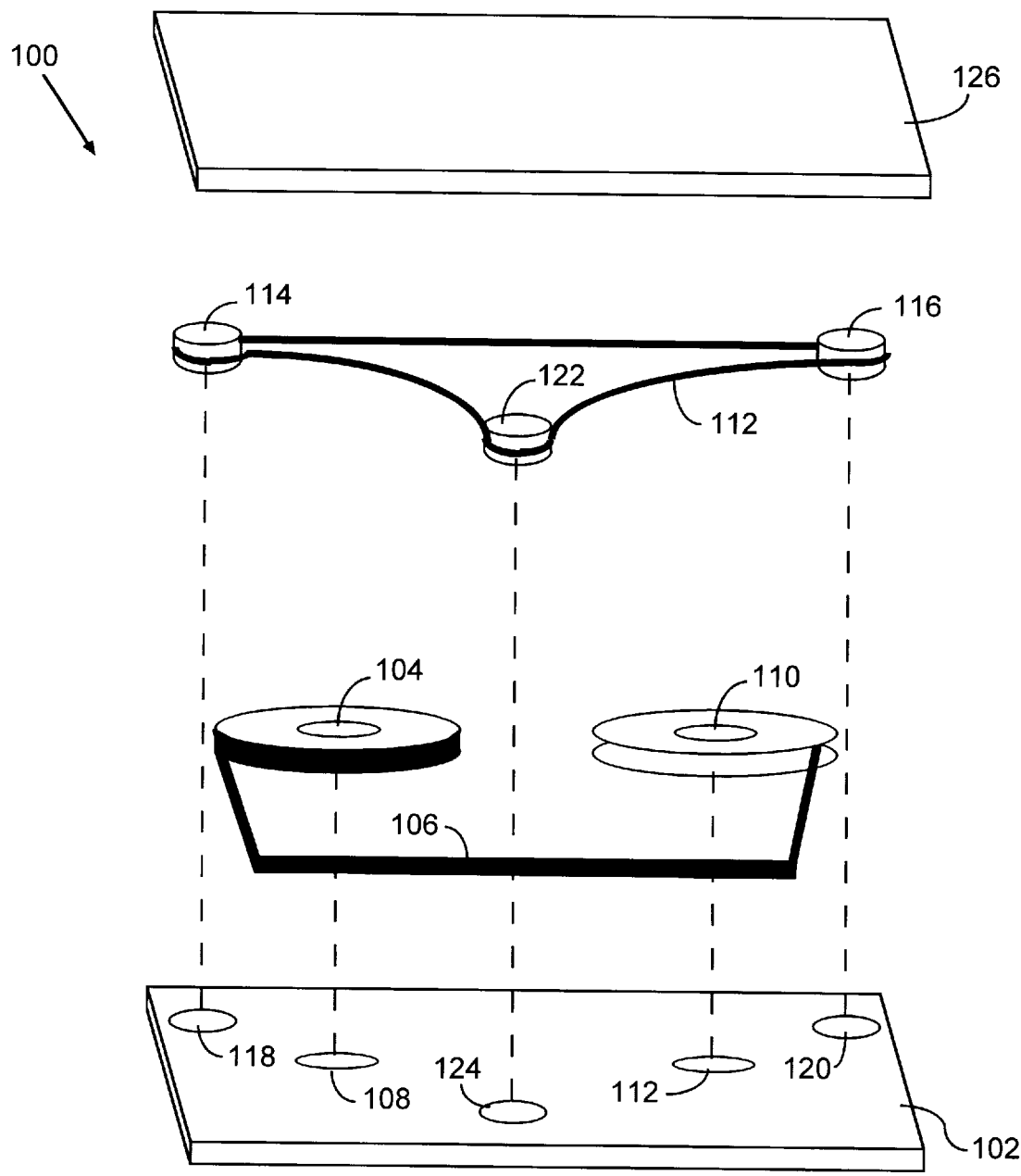
FIG. 1 is a diagram illustrating the major components of a typical belt-driven tape cartridge.

FIG. 1 is a diagram illustrating the major components of a typical belt-driven tape cartridge 100. A cartridge base plate 102 provides the foundation of the tape cartridge 100, upon which various components of the tape cartridge 100 are mounted. The supply hub 104 is enwrapped with magnetic tape 106 about its circumference to form a supply reel of magnetic tape. The supply hub 104 can freely rotate about its axis when mounted to a mounting aperture 108 on the cartridge base plate. A free end of the tape is directed connected to a take-up hub 110, which rotates about its axis when mounted to mounting aperture 112. As the hubs rotate, the tape is transferred from the supply hub 104 to the take-up hub 110.

In order to rotate the tape hubs, many tape cartridges include a belt drive system that includes a flat, elastomeric drive belt 112 which is looped around at least two belt guide rollers 114 and 116 which rotate in the cartridge base plate 102 via mounting apertures 118 and 120 respectively. The drive belt 112 is also looped around a belt capstan 122 which rotates within mounting aperture 124. Rotating the belt capstan imparts motion to the drive belt 112, which in turn rotates the supply and take-up hubs 104, 110 due to the drive belt's 112 position against a portion of the tape 106. Rotation of the supply and take-up hubs 104, 110 causes the tape to move within the tape cartridge 100, and tape tension is maintained due to the elastomeric properties of the drive belt 112. A cartridge cover 126 encases the tape and other components within the tape cartridge 100.

Figure 2:
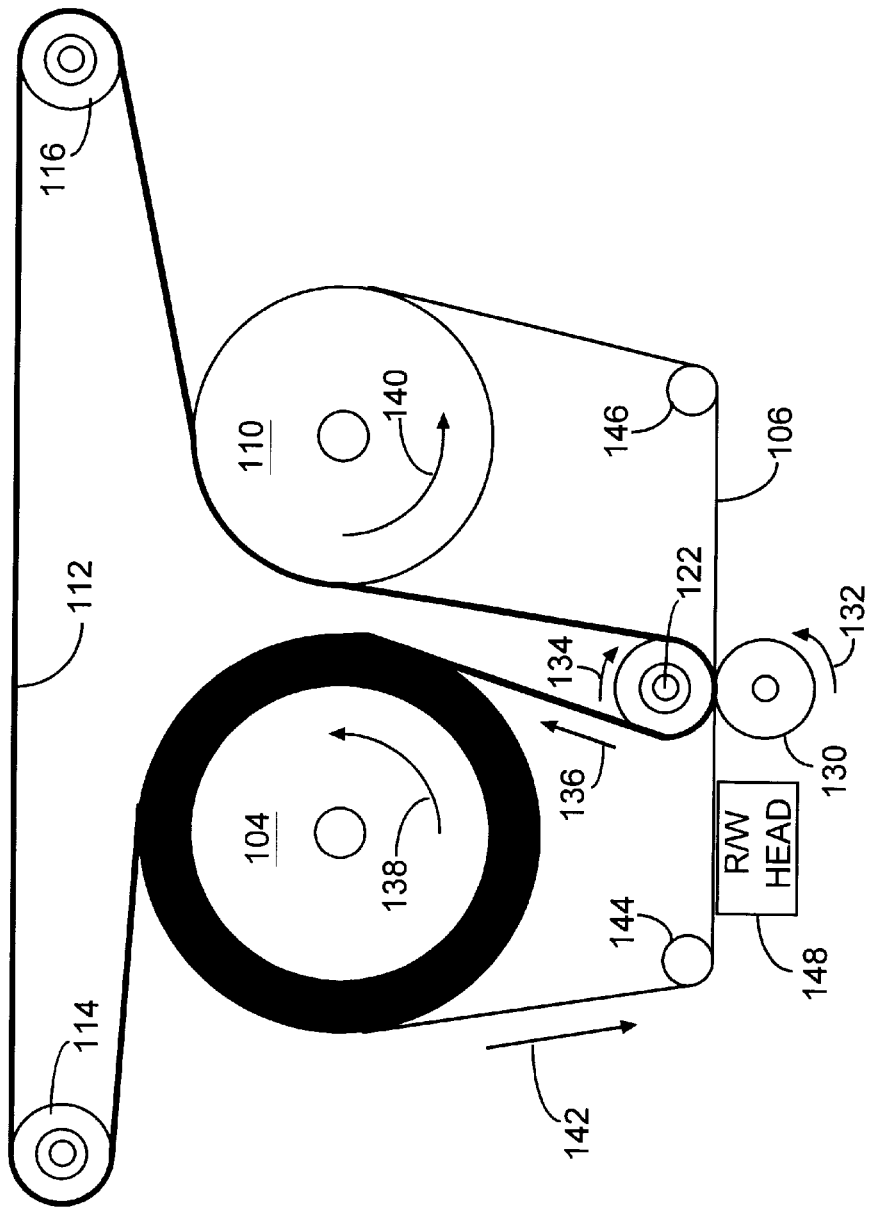
FIG. 2 illustrates the motion of the tape due to the rotation of the drive roller and the imparted motion to the drive belt.

FIG. 2 illustrates the motion of the tape 106 due to the rotation of the drive roller 130 and the imparted motion to the drive belt 112. The drive roller 130 is located within a tape drive in which the tape cartridge is inserted. The drive roller 130 has elastomeric properties on its outer surface, typically by placing a rubber cover on the drive roller 130. The drive roller 130 engages the belt capstan 122, but not the drive belt 112, when the tape cartridge is inserted into the tape drive. A drive motor rotates the drive roller 130, which in turn rotates the belt capstan 122 in the opposite direction, as seen by directional arrows 132 and 134. When the belt capstan 122 rotates in the direction of arrow 134, the drive belt 112 moves around the belt guide rollers 114, 116 and the belt capstan 122 in the direction represented by arrow 136. Because the drive belt 112 engages the tape wound around the supply 104 and take-up 110 reels, the supply and take-up reels rotate in the direction of arrows 138 and 140 respectively. This causes the tape 106 to move in the direction represented by arrow 142 around the tape guides 144 and 146 from the supply reel 104 to the take-up reel 110. The tape passes beside the read/write head 148 within the tape drive, which writes and reads information to and from the magnetic tape 106.

Figure 3:
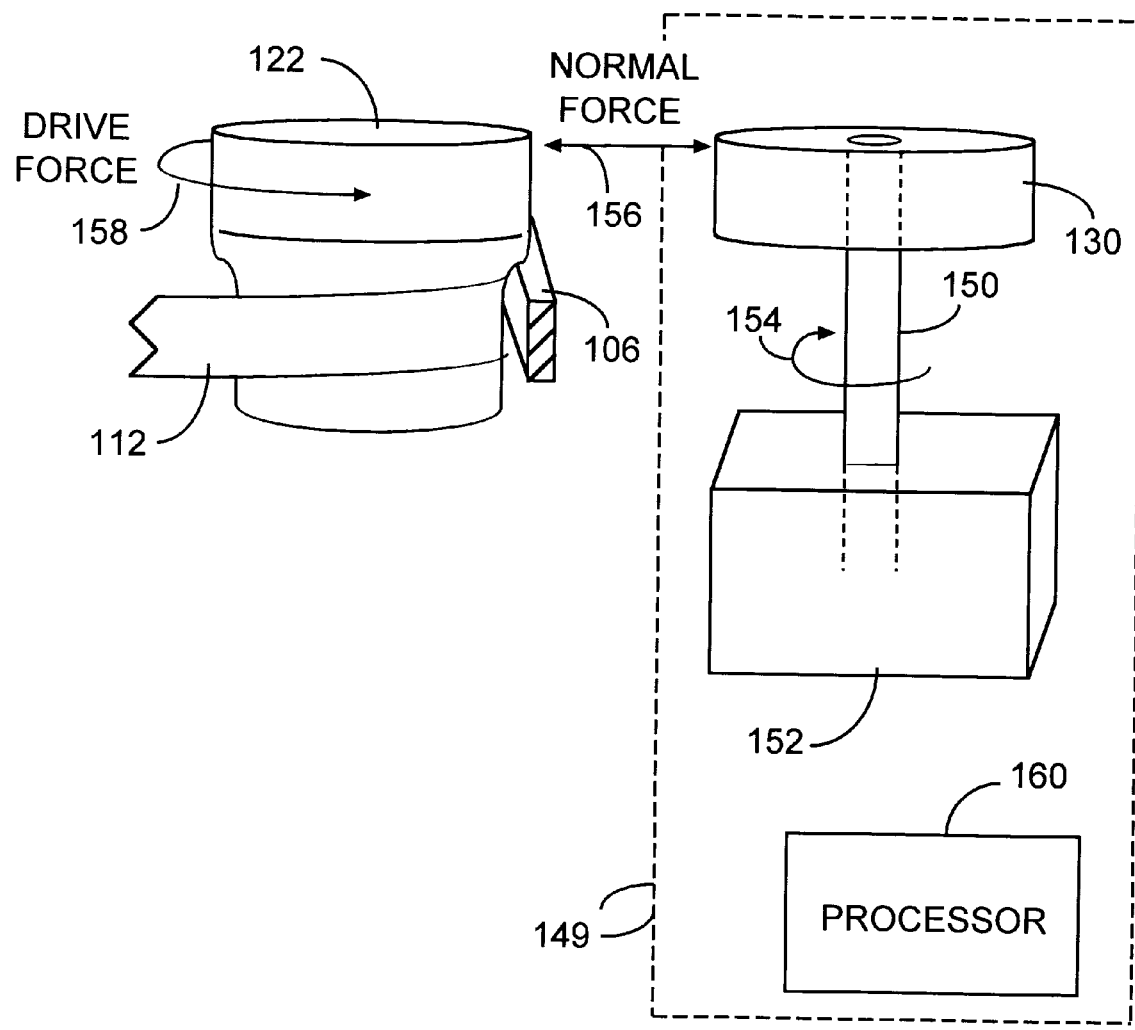
FIG. 3 is a diagram illustrating the forces causing tape rotation in a belt-driven tape cartridge.

Referring now to FIG. 3, a diagram of the forces causing tape rotation is provided. The motion imparted to the drive belt 112, and ultimately the tape 106, occurs by virtue of the rotation of the drive roller 130 and the rotation of the belt capstan 122 when the drive roller 130 and the belt capstan 122 come into contact with one another. The drive roller 130 within the tape drive 149 is connected to a drive capstan 150, which is rotated at a substantially constant speed by the drive motor 152. Drive motors for tape system capstans are well known in the art. As the drive motor 152 rotates the drive capstan 150 in the direction of arrow 154, the connected drive roller 130 also rotates. When the tape cartridge is inserted into the tape drive, the belt capstan 122 is pressed against the drive roller 130, which causes the belt capstan to rotate. The quantity of pressure applied in the direction of arrow 156 is referred to as the "normal force". The friction present between the drive roller 130 and the belt capstan 122 as a result of this normal force is what allows the belt capstan 122 to rotate as the drive roller 130 rotates. As the drive roller 130 rotates, the angular velocity of the drive roller 130 imparts velocity to the belt capstan 122. Rotation of the belt capstan 122 imparts motion to the elastomeric drive belt 112, which ultimately causes the tape 106 to move from the supply reel to the take-up reel. In the present example, the drive roller 130 does not touch the tape, but rather the drive belt 112 touches the tape proximate the supply and take-up hubs as previously described.

Another relevant force at play is the "drive force" of the belt capstan 122. The drive force is the force required to rotate the belt capstan 122 at its target velocity in the direction of arrow 158. The drive force is a combination of various factors, including the friction and drag inside the tape cartridge.

In accordance with the present invention, imminent capstan slip on belt-driven tape cartridges can be predicted before capstan slip actually occurs. This can be accomplished by monitoring the tape velocity, as the critical variables that affect tape velocity are also the same variables that affect capstan slip in tape drives utilizing belt-driven tape cartridges. These variables are the normal force and the drive force previously described.

The effects of drive force and normal force on velocity is not intuitive. The rotational velocity of the drive roller 130 is constant and is translated into motion of the tape through a series of elastomeric drive components. As the normal force decreases and the drive force increases, the tape velocity decreases. This phenomenon of decreasing tape velocity is independent of capstan slip. The velocity variation in tape velocity of belt-driven tape cartridges has a very controlled, predictable behavior that acts over a large range of normal forces and velocities. Capstan slip, on the other hand, has a step function response in velocity. However, the same variables that affect capstan slip also affect tape velocity, namely the normal force and the drive force. Therefore, by monitoring the tape velocity, imminent capstan slip can be predicted.

As previously indicated, the tape velocity in belt-driven tape cartridge systems can vary under normal operating conditions. Because the drive roller 130 has a substantially constant velocity, other factors cause the tape velocity to change. Those factors are the normal force (i.e., the force of the drive roller 130 against the belt capstan 122) and the drive force (i.e., the force required to rotate the belt capstan 122). By monitoring these two variables and knowing characteristics such as the coefficient of rolling friction and the spring coefficient of the elastomeric components (e.g., drive roller), it can be determined when the physical engagement between the drive roller 130 and the belt capstan 122 would slip such that the rolling friction would become sliding friction.

However, it is also the drive force and the normal force that affect the velocity of the tape. As the normal force of the drive roller 130 increases with respect to the belt capstan 122, the velocity of the tape 106 will increase relative to the velocity of the drive roller 130. Analogously, as the normal force decreases with respect to the belt capstan 122, the velocity of the tape 106 decreases relative to the velocity of the drive roller 130. This phenomenon is due to the elastomeric characteristics of the drive roller 130, which deforms as the normal force increases. The drive force also affect velocity in that an increase in drive force causes the velocity of the tape 106, relative to the velocity of the drive roller 130, to decrease. In other words, where the drive force and normal force are altered, it can affect the steady-state velocity of the tape. In one embodiment of the invention, a processor 160 is used to monitor the steady-state velocity of the tape to provide an imminent, or "predicted", capstan slip notification. The processor 160 can be used in connection with other hardware or software modules, such as a servo system, to provide this steady-state velocity measurement. The imminent slip notification is provided when the tape velocity reaches a steady-state velocity threshold value corresponding to a velocity present when the normal and drive forces are such that the tape is at risk of slip.

Figure 4:
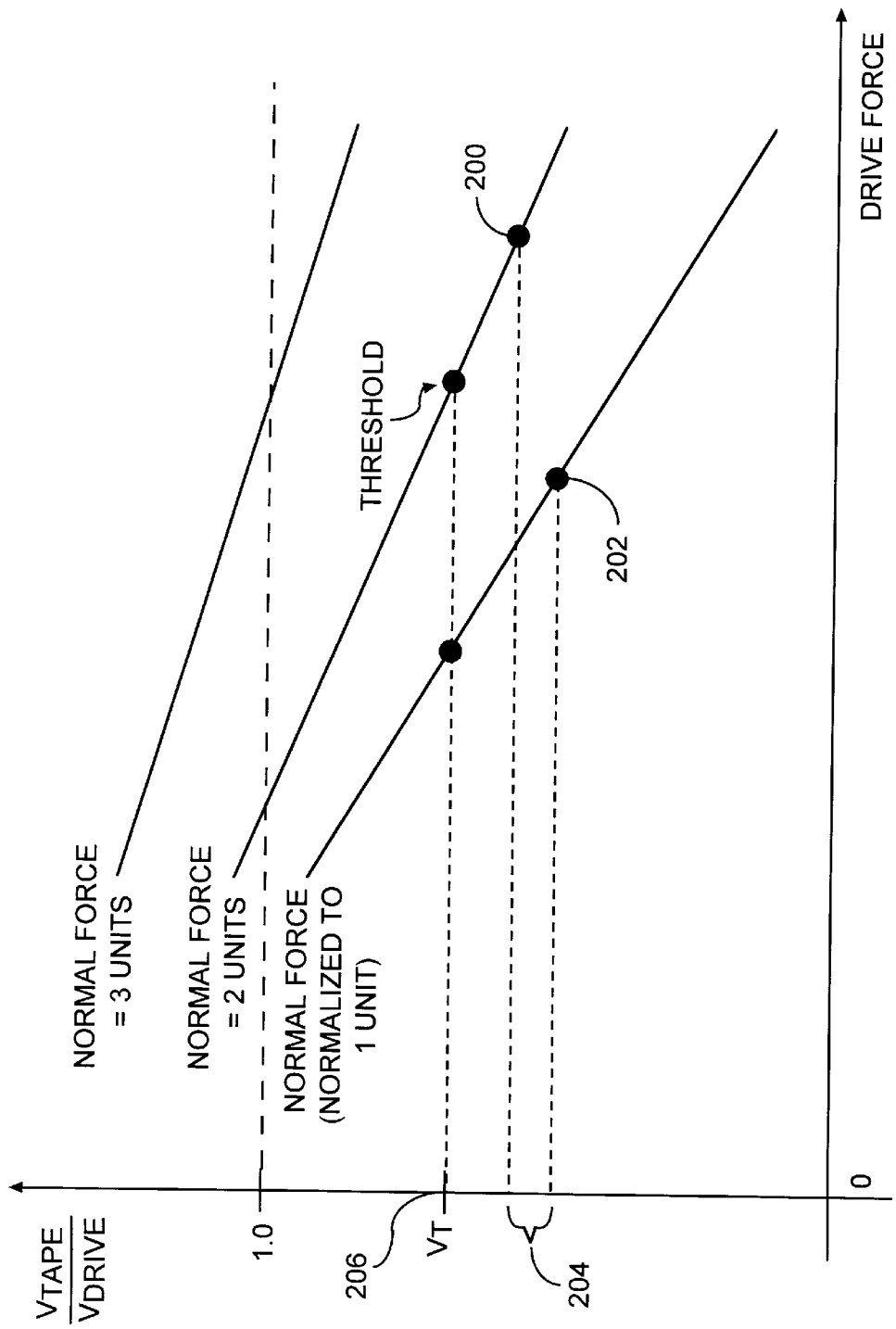
FIG. 4 generally illustrates the effect of the normal forces and drive forces on the ratio of the tape velocity to the angular drive roller velocity.

Therefore, capstan slippage based on the normal and drive forces can be determined by extrapolating the range of drive forces and normal forces at risk for capstan slip to a velocity ratio value. FIG. 4 generally illustrates the effect of normal forces and drive forces on the ratio of the steady-state tape velocity to the angular drive roller velocity ($V_{TAPE}/V_{DRIVE}$). Because the velocity of the drive roller is substantially constant, this ratio can be approximated by the velocity of the tape, $V_{TAPE}$.

FIG. 4 illustrates that as the normal force decreases at a given drive force, the velocity of the tape decreases. Similarly, an increasing drive force at a constant normal force also causes the tape velocity $V_{TAPE}$ to decrease. Where it is determined mathematically using coefficients of friction, or empirically, that slippage may occur at particular points on the normal/drive force graph (i.e., points 200, 202), a critical tape velocity range 204 may be projected. A threshold velocity $V_T$ 206 can then be selected above the critical velocity range 204. When the tape 106 reaches this threshold velocity, a signal can be sent within the tape system to indicate that a capstan slip is imminent.

As previously indicated, these velocity variations are due to the elastomeric properties of the drive belt 112, and particularly the drive roller 130. The drive roller 130, which in one embodiment is rubber-coated, which can stretch and deform slightly depending on the normal and drive forces. The elastomeric drive belt 112 experiences similar physical variations. These physical variations due to the elastomeric characteristics create minute slippage referred to as "micro-slip". Physical deformation and micro-slip in such tape drive systems is not only normal and expected, but necessary for proper operation of the system.

Figure 5:
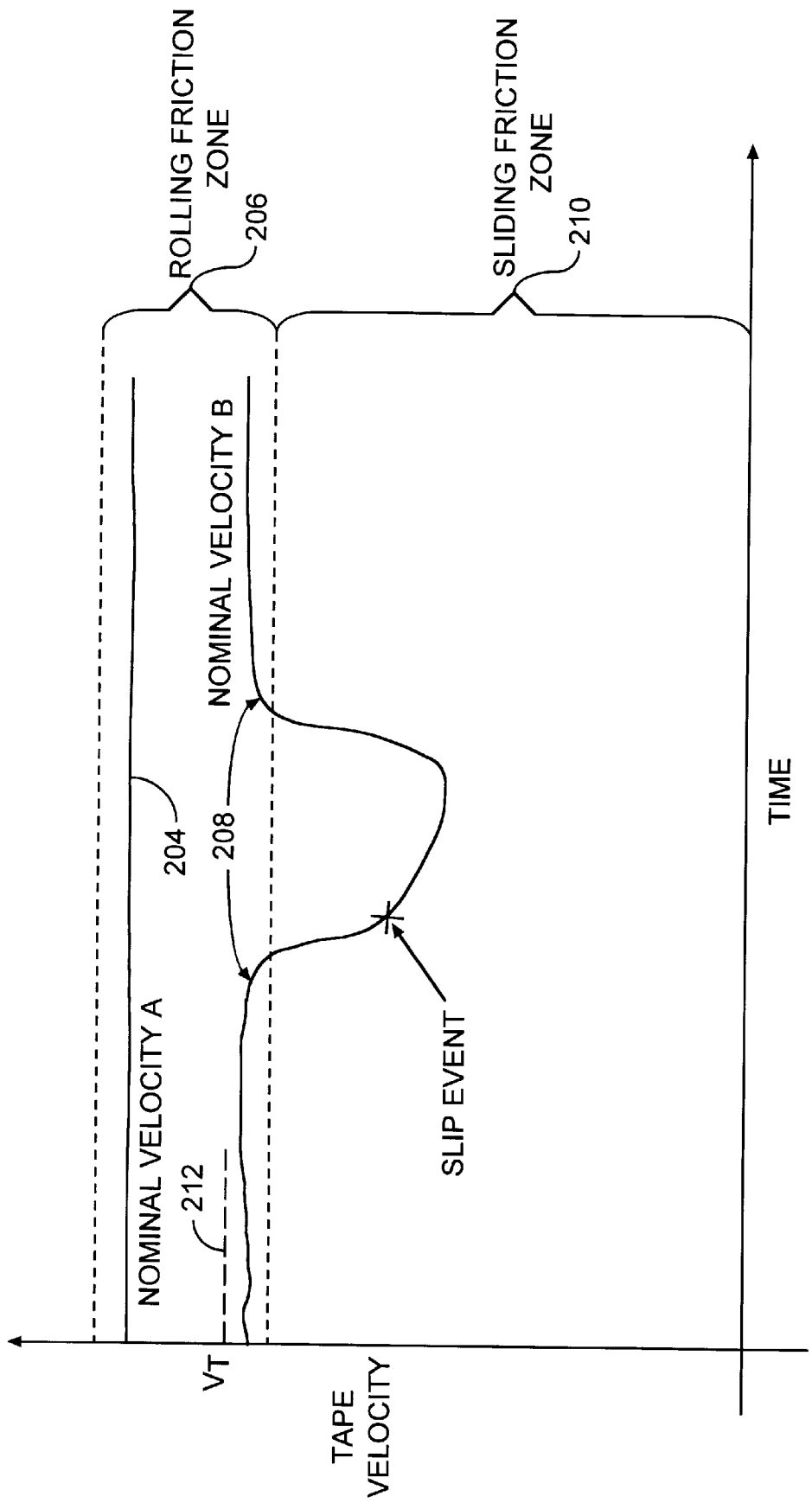
FIG. 5 is a graphical illustration of how the steady-state velocity is used to predict imminent capstan slip in accordance with the present invention.

FIG. 5 is a graphical illustration of how the steady-state velocity is used to predict imminent capstan slip in accordance with the present invention. The prior art detects a sudden deviation in velocity where the tape is sliding rather than rolling. The present invention recognizes that a nominal, i.e. steady-state, velocity will change in a tape drive system having elastomeric components even where the tape is still in the rolling friction, rather than the sliding friction, zone. In FIG. 5, a first nominal velocity, labeled Nominal Velocity A 204 is shown within the rolling friction zone 206. This nominal velocity is well within the rolling friction zone 206, and does not pose an immediate threat of tape slippage. However, the Nominal Velocity B 208 is shown relatively close to the sliding friction zone 210 where tape slipping can occur. A threshold velocity $V_T$ 212 is selected, and a steady-state velocity below this threshold will indicate a potential slip condition. As seen in FIG. 5, the Nominal Velocity B 208 is still in the rolling friction zone 206, and has not yet begun to experience slipping. However, due to the elastomeric properties of the drive roller and elastomeric belt, the nominal velocity can change without the occurrence of slipping, and a steady-state velocity near the sliding friction zone 210 may indicate possible future capstan slip.

Therefore, the present invention predicts an imminent occurrence of sliding friction by monitoring the steady-state velocity of the tape. No significant abrupt change in velocity is required to determine imminent slip, and the prediction of imminent slip is accomplished before reaching the sliding friction zone. This provides a great deal of protection from data corruption as all monitoring occurs within the rolling friction, or "non-slipping", zone.

Figure 6:
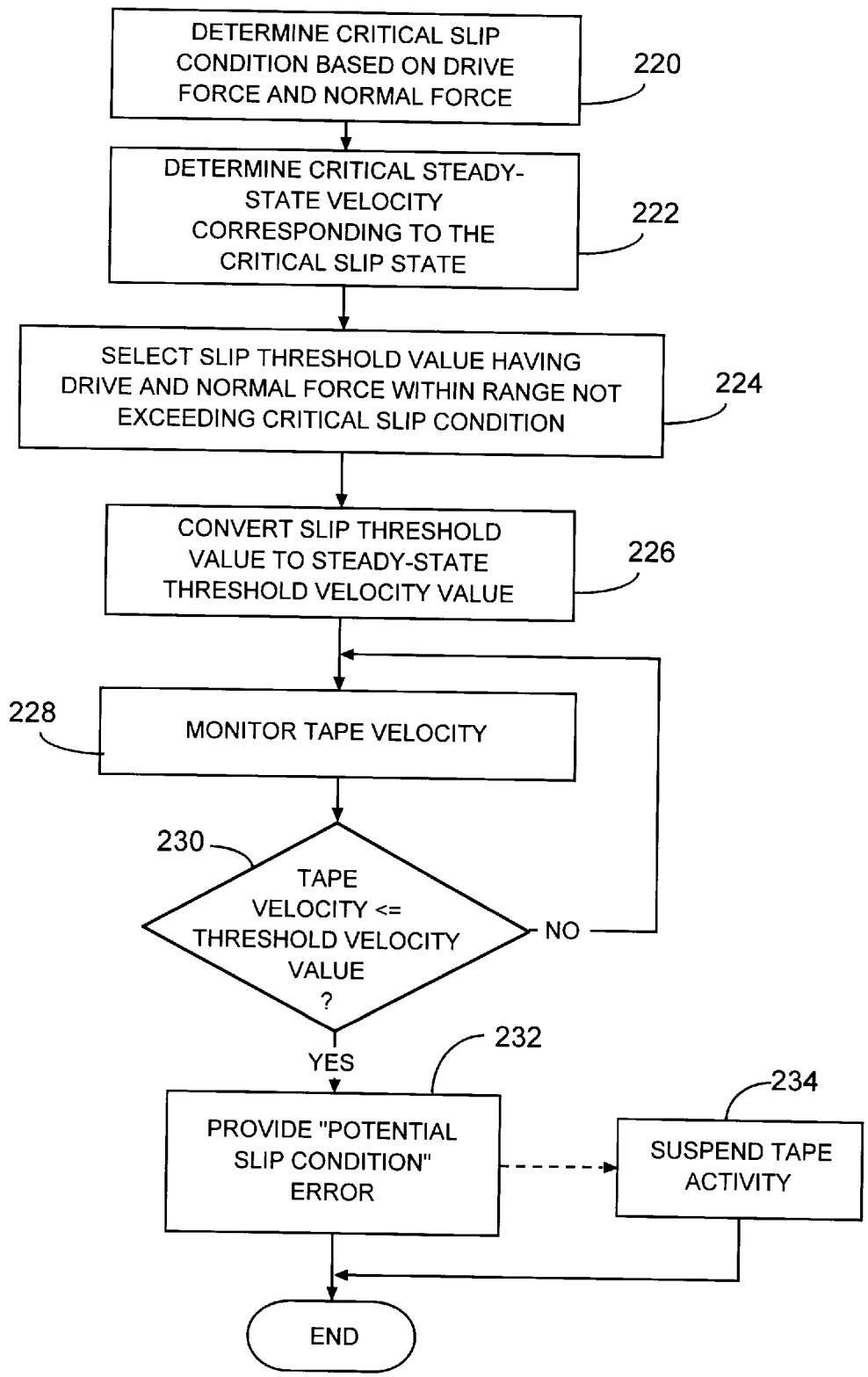
FIG. 6 is a flow diagram illustrating a method of predicting capstan slip in a tape drive system incorporating belt-driven tape cartridges in accordance with the present invention.

FIG. 6 is a flow diagram illustrating a method of predicting capstan slip in a tape drive system for belt-driven tape cartridges. A critical slip condition is determined 220, based on the drive force and normal force in the tape drive system, and corresponds to a point where rolling friction may turn to sliding friction. This can be determined through mathematical calculation of the point in which the rolling friction will turn to sliding friction. The amount of elasticity, which includes a spring coefficient, of the drive roller 130 and the drive belt 112 are also used in such a calculation. Alternatively, the critical slip condition may be determined empirically through a study of drive and normal forces that are at risk for capstan slip.

When a critical slip condition based on the drive force and normal force has been determined, the critical steady-state velocity corresponding to the critical slip condition is determined 222. The variables that affect slipping in a tape drive system for belt-driven tape cartridges, i.e. the drive force and normal force, also affect the velocity of the tape. Therefore, converting the critical slip condition to a velocity value provides a means for determining the critical slip state from a critical tape velocity.

Knowing the critical slip condition, a slip threshold value of drive and normal forces can be selected 224, and the slip threshold value can then be converted 226 to a threshold tape velocity value. The slip threshold value is selected as a value corresponding to drive and normal forces which are not in the range of the critical slip condition, which is then converted to a velocity value. For example, if the critical slip condition occurs when the drive and normal forces correspond to a velocity of approximately $V_{CRITICAL}$, then the threshold value is selected so that $V_T > V_{CRITICAL}$. In this manner, the threshold tape velocity can be detected prior to the occurrence of critical tape velocity.

Therefore, once the critical velocity and threshold velocity values are determined, the steady-state tape velocity is monitored 228. While the steady-state tape velocity remains greater than the threshold velocity value as determined at decision block 230, the tape velocity continues to be monitored. However, where the steady-state tape velocity decreases such that it reaches the threshold velocity value, a "potential slip condition" error is provided 232. Optionally, tape activity may be suspended 234 to ensure that no information errors occur.

Various methods of measuring the velocity of the tape can be implemented. In one embodiment of the invention, the clock frequency of the tape drive system can be measured during a read cycle and compared to the clock frequency during a write operation. Dissimilar clock frequencies during these times may indicate a tape velocity problem.

Figure 7:
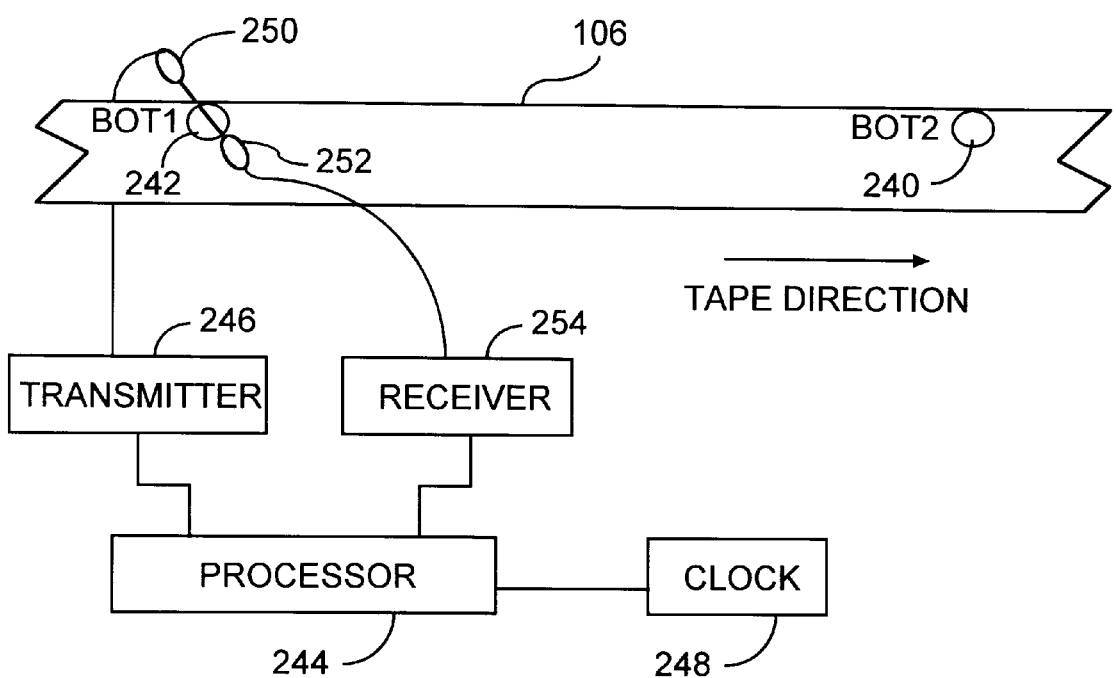
FIG. 7 is a block diagram illustrating one manner of determining the velocity of the tape using existing tape indicia in a QIC tape cartridge.
Figure 8A:
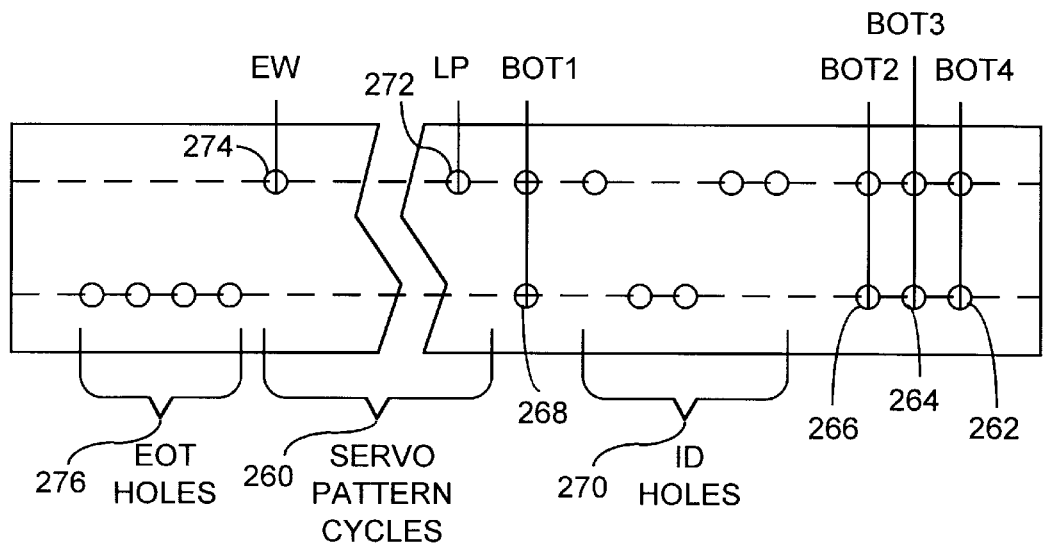
FIGS. 8A and 8B are diagrams illustrating the use of a servo pattern cycle to continually monitor the velocity of the tape.

FIG. 7 is a block diagram illustrating another manner of determining the velocity of the tape 106. Many tape systems, such as QIC tape systems, provide indicia on the tape to indicate various characteristics of the tape, such as cartridge identification, and the beginning and end of the tape. This type of indicia is often provided as openings in the tape as seen in FIG. 8A. Where holes of this nature are provided on a tape, light sensing technology may be used to determine when a hole passes the light sensor while the tape moves. Because the distance between certain holes on the tape is known, the velocity of the tape can be determined by determining the time it takes for the tape to travel a distance between two given holes.

For example, FIG. 7 illustrates a tape 106 having two holes, separated by a known distance, such as beginning of tape holes BOT2 240 and BOT1 242. A processor 244 transmits a signal via transmitter 246 which is coupled to an optical device, such as a light-emitting diode (LED) 250. The LED 250 transmits light through hole 242 to a receiver 252 which is coupled to a receiver 254 to trigger the processor 244. A clock 248 generates clock cycles which are used to trigger a counter function within the processor 244. The processor 244 keeps track of the clock cycles occurring between the holes 240, 242, by storing the number of clock cycles occurring from the time the counter function is initiated at hole 240 to the time the counter function is stopped at hole 242. Because the present invention operates on a threshold velocity value rather than on a comparison of two velocity values, no additional velocity value calculation is needed. Other light transmission and sensing mechanisms may also be used, such as a system utilizing a light source, a mirror, and a photocell.

It may be desirable, however, to continually monitor the velocity of the tape throughout usage of the tape. Because tape indicia such as BOT and EOT (end of tape) holes are only used at the beginning and end of the tape, other means for determining velocity of the tape must be utilized. One such means is through the use of magnetically-stored indicia that is recognizable throughout the length of the tape.

Figure 8B:
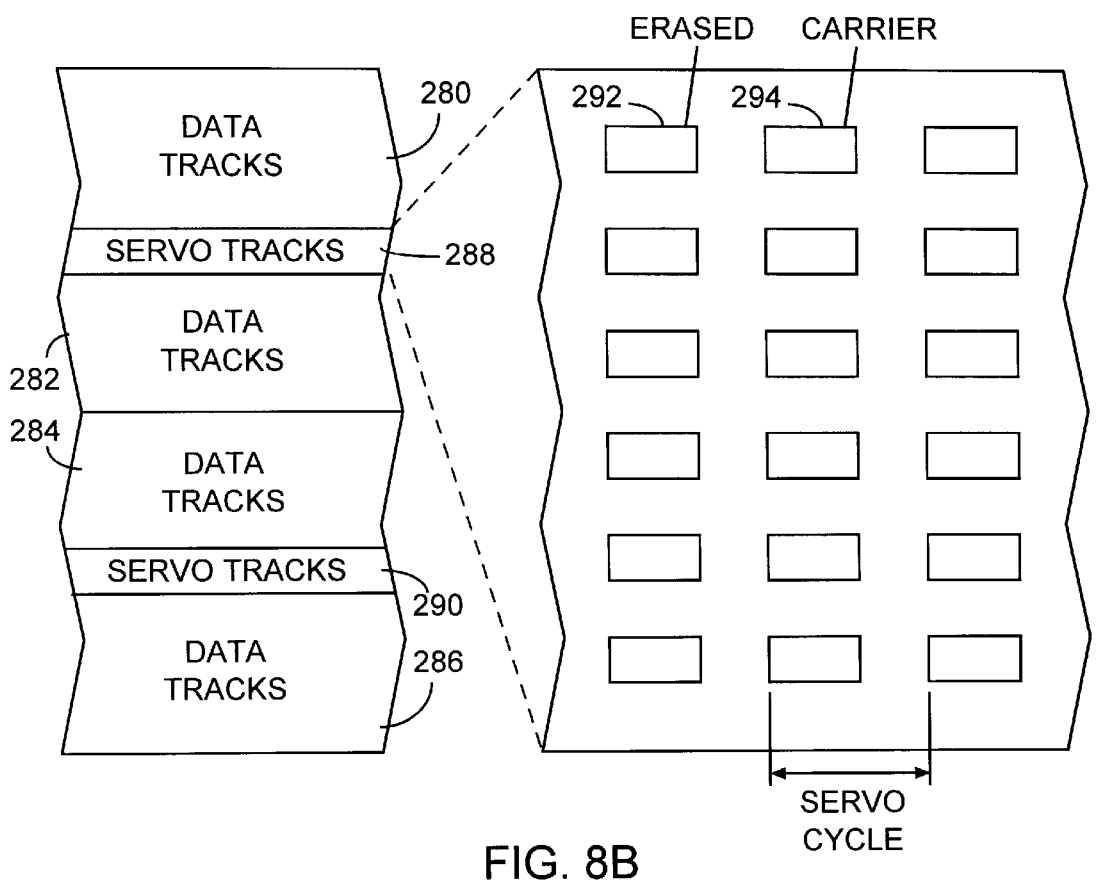

FIGS. 8A and 8B are diagrams illustrating the use of a servo pattern cycle to continually monitor the velocity of the tape. In one embodiment of the invention, the tape drive system includes a continuous tape velocity monitoring capability. This allows capstan slip prediction to be continually monitored while the tape is moving. One manner of providing continuous tape velocity monitoring is through the use of a servo system employing a phase-locked loop to detect signal edges. A servo system is an automated control system for maintaining a condition at or near a predetermined value by comparing the required condition with the actual condition, and adjusting the control element in accordance with the difference or the rate of change of the difference. In one embodiment of the invention, a processor is used in connection with the servo system to calculate the tape velocity.

For proper operation, a tape servo system requires that a servo pattern be pre-recorded onto the tape to provide the triggering signal edges to the phase-locked loop. The pre-recorded signal consists of a carrier and erased areas on the tape. FIG. 8A illustrates the tape location 260 of the servo pattern cycles on a QIC tape. A QIC tape includes multiple beginning of tape (BOT) indicators, such as BOT4 262, BOT3 264, BOT2 266, and BOT1 268. Between BOT2 266 and BOT1 268 are the identification holes 270. Following BOT1 268 is a load point (LP) hole 272 which indicates the beginning of the servo pattern cycles 260 on the tape. The early warning (EW) hole 274 identifies the end of the servo pattern cycles, and the end of tape holes 276 identify the end of the tape. Between the LP 272 and the EW 274 holes, there may be over a million servo pattern cycles. The servo pattern cycles may be used by the tape drive system to indicate the velocity of the tape.

The location of the servo tracks and a typical servo pattern layout on a QIC tape are illustrated in FIG. 8B. Data tracks for storing and reading data are positioned at locations 280, 282, 284 and 286. Locations 288 and 290 on the QIC tape include a plurality of servo tracks that include a pre-recorded servo pattern of erased 292 and carrier 294 areas. The precise distance between these erased and carrier areas on the tape allow the tape drive system to determine the velocity of the tape as the tape passes the read/write head of the tape drive system. Because these servo patterns occur over a substantial majority of the length of the tape, velocity can be measured as the tape is in use, and monitoring for slip conditions in accordance with the present invention can be substantially continuous.

Once a potential capstan slip condition is identified, it is desirable to determine whether the identified problem is associated with the tape cartridge or the tape drive itself. Problems associated with the tape cartridge include an undesirably high drive force, or low penetration of the belt capstan into the tape drive. Problems associated with the drive include low spring force by the drive roller against the belt capstan, a damaged cartridge locator mechanism, and improperly mounted or damaged drive motor. To distinguish between tape cartridge and drive problems, a special test cartridge can be used.

Figure 9:
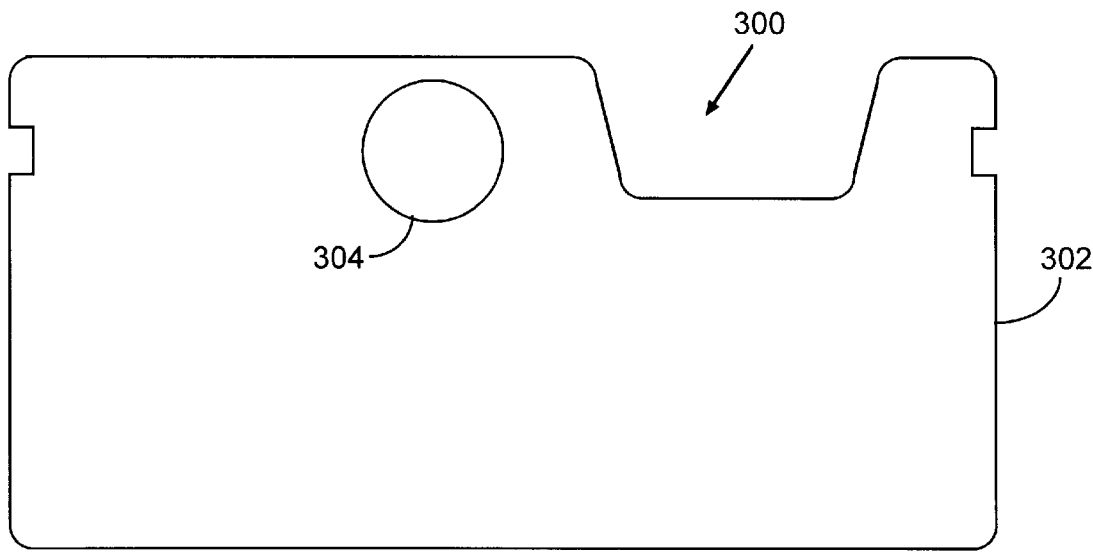
FIG. 9 is a diagram of a test cartridge used in determining whether an identified potential slip condition is due to a problem with the tape cartridge or the tape drive.

FIG. 9 is a diagram of a test cartridge 300 used in determining whether the identified potential slip condition is a result of a problem with the tape cartridge or the tape drive. The test cartridge 300 includes a tape body 302, which has no tape, belt or rollers. In place of the belt capstan, the test cartridge 300 includes a wheel lobe 304, which is a disk-shaped protrusion molded into the tape body 302 that is the same size, shape, material, and surface finish as the normal belt capstan. The wheel lobe 304 is integral or fixed to the tape body 302 such that it will not rotate.

Figure 10:
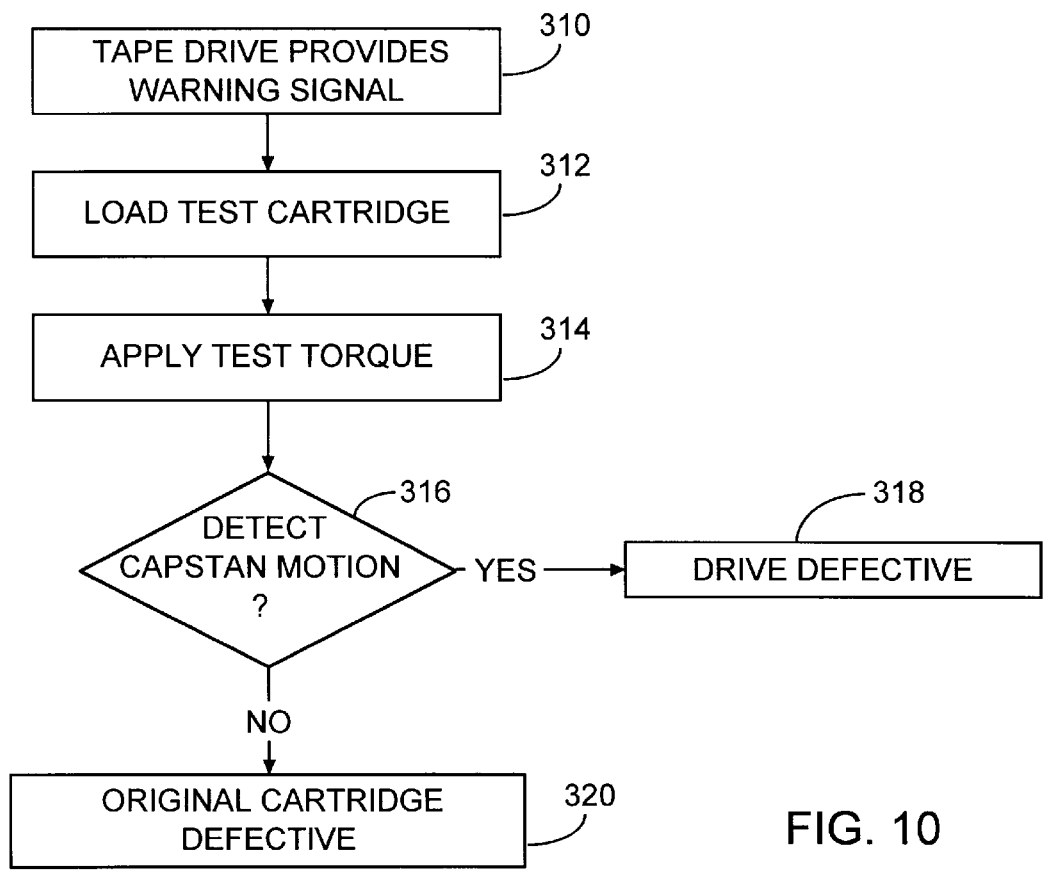
FIG. 10 is a flow diagram illustrating one manner in which the test cartridge is used to determine whether an identified potential capstan slip condition is due to a problem with the tape drive or with the original tape cartridge.

FIG. 10 is a flow diagram illustrating one manner in which the test cartridge 300 is used to determine whether an identified potential capstan slip condition is due to a problem with the tape drive or with the original tape cartridge. The tape drive provides a warning signal at step 310 upon recognizing a potential capstan slip condition, as previously described. The tape cartridge is removed, and a test cartridge is loaded 312 into the tape drive. The test cartridge is identifiable by the tape drive as a capstan test cartridge, and the tape drive applies a test torque to the drive roller as indicated at step 314. If capstan motion is detected at decision step 316, the tape drive posts an error that it is defective 318, and that it should be serviced or replaced. Capstan motion in this instance would indicate that the capstan rotating the drive roller has become detached or loosened from the drive roller. If no capstan motion is detected, the tape drive is likely not defective, which would indicate that the original tape cartridge was defective as seen as step 320.

As noted above, the present invention provides a system and method for predicting capstan slip conditions in tape drive systems which operate on belt-driven tape cartridges. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A method for predicting capstan slip conditions between a tape cartridge belt capstan of a belt-driven tape cartridge and a drive roller of a tape drive, the method comprising:

determining a critical tape velocity value corresponding to a critical slip condition based on a relationship between a drive force for rotating the cartridge belt capstan and a normal force of the drive roller against the cartridge belt capstan;

selecting a threshold tape velocity value corresponding to the drive force and the normal force at a point where the relationship between the drive force and the normal force would not encounter the critical slip condition;

monitoring a steady-state tape velocity representative of the drive force and the normal force during operation of the belt-driven tape cartridge in the tape drive; and providing an imminent capstan slip indication when the steady-state tape velocity reaches the threshold velocity value, whereby the imminent capstan slip indication is provided prior to occurrence of the critical slip condition.

2. The method as in claim 1, wherein providing an imminent capstan slip indication comprises comparing the steady-state tape velocity during operation of the belt-driven tape cartridge to the threshold velocity value.

3. The method as in claim 1, wherein:

monitoring the steady-state tape velocity comprises monitoring the steady-state tape velocity when the drive roller and the belt capstan maintain a rolling friction therebetween; and providing an imminent capstan slip indication comprises providing the imminent capstan slip indication when the steady-state tape velocity is within a predetermined velocity margin of a sliding friction band, wherein the drive roller and the belt capstan continue to maintain the rolling friction therebetween.

4. The method as in claim 1, wherein monitoring the steady-state tape velocity comprises determining a time interval between two tape indicia separated by a known distance.

5. The method as in claim 4, wherein determining a time interval comprises:

initiating a counter upon recognition of a first of the two tape indicia, wherein the counter is incremented at known clock intervals;

terminating the counter upon recognition of a second of the two tape indicia; and converting a resulting counter value to a time value corresponding to the time interval.

6. The method as in claim 1, wherein monitoring the steady-state tape velocity comprises continually measuring the steady-state tape velocity during operation of the belt-driven tape cartridge.

7. The method as in claim 6, wherein continually measuring the steady-state tape velocity comprises:

providing one or more servo tracks along the length of the tape, wherein each of the servo tracks comprises a pre-recorded servo pattern including a plurality of servo cycles separated at known distances;

monitoring a time interval between predetermined ones of the servo cycles; and calculating the steady-state tape velocity based on the time interval and the known distance between the predetermined ones of the servo cycles.

8. The method as in claim 1, wherein determining a critical velocity value corresponding to a critical slip condition comprises calculating the drive force and the normal force at a point wherein a rolling friction between the cartridge belt capstan and the drive roller is approximately equal to the sliding friction between the cartridge belt capstan and the drive roller, and converting the calculated drive and normal forces to the critical velocity value.

9. The method as in claim 1, wherein determining a critical velocity value corresponding to a critical slip condition comprises empirically measuring the drive force and the normal force at a point wherein a rolling friction between the cartridge belt capstan and the drive roller is approximately equal to the sliding friction between the cartridge belt capstan and the drive roller, and converting the calculated drive and normal forces to the critical velocity value.

10. The method as in claim 1, wherein selecting a threshold velocity value comprises selecting the threshold velocity value to be at a higher velocity level than the critical velocity value.

11. The method as in claim 10, wherein selecting the threshold velocity value to be at a higher velocity level than the critical velocity value further comprises selecting the threshold velocity value at a velocity level corresponding to the drive force and the normal force where a friction between the drive roller and the belt capstan is a rolling friction rather than a sliding friction.

12. The method as in claim 1, further comprising suspending operation of the belt-driven tape cartridge within the tape drive upon the occurrence of the imminent capstan slip indication.

13. A method for predicting tape transit errors in a belt-driven tape cartridge during operation in a tape drive, wherein the tape transit errors are caused by slipping of an elastomeric tape drive roller on a cartridge belt capstan, the method comprising:

determining the normal force of the elastomeric tape drive roller against the cartridge belt capstan and the angular drive force of the cartridge belt capstan which results in capstan slip;

extrapolating the normal force and drive force resulting in the capstan slip to a critical tape velocity value;

designating a tape velocity threshold value at a higher velocity level than the critical velocity value;

monitoring a tape velocity within the belt-driven tape cartridge; and providing a warning of an imminent slip condition where the tape velocity has decreased to the velocity threshold value.

14. The method as in claim 13, wherein extrapolating to a critical velocity value comprises determining the tape velocity at a time the normal force and the drive force result in the capstan slip.

15. The method as in claim 13, wherein extrapolating the normal force and the drive force resulting in the capstan slip to a critical velocity value comprises:

determining a sliding scale relationship between the normal forces and the drive forces which result in the capstan slip;

determining a range of tape velocities that correspond to the normal forces and the drive forces which result in the capstan slip; and designating a lowest velocity value of the range of tape velocities as the critical velocity value.

16. The method as in claim 15, wherein determining a sliding scale relationship comprises calculating the drive forces and the normal forces where either the elastomeric drive belt or the elastomeric tape drive roller slips on the cartridge belt capstan.

17. The method as in claim 15, wherein determining a sliding scale relationship comprises measuring the drive forces and the normal forces present where either the elastomeric drive belt or the elastomeric tape drive roller slips on the cartridge belt capstan.

18. The method as in claim 13, wherein monitoring the tape velocity comprises continually measuring the tape velocity during operation of the belt-driven tape cartridge.

19. The method as in claim 18, wherein continually measuring the tape velocity comprises:

providing one or more servo tracks along the length of the tape, wherein each of the servo tracks comprises a pre-recorded servo pattern including a plurality of servo cycles separated at known distances;

monitoring a time interval between predetermined ones of the servo cycles; and calculating the tape velocity based on the time interval and the known distance between the predetermined ones of the servo cycles.

20. A method for predicting capstan slip conditions between a tape cartridge belt capstan of a belt-driven tape cartridge and a drive roller of a tape drive, and for determining which of the belt-driven tape cartridge or the tape drive is defective, the method comprising:

determining a critical tape velocity value corresponding to a critical slip condition based on a relationship between a drive force for rotating the cartridge belt capstan and a normal force of the drive roller against the cartridge belt capstan;

selecting a threshold tape velocity value corresponding to the drive force and the normal force at a point where the relationship between the drive force and the normal force would not encounter the critical slip condition;

monitoring a steady-state tape velocity representative of the drive force and the normal force during operation of the belt-driven tape cartridge in the tape drive;

providing an imminent capstan slip indication when the steady-state tape velocity reaches the threshold velocity value, whereby the imminent capstan slip indication is provided prior to occurrence of the critical slip condition;

replacing the belt-driven tape cartridge, in response to the imminent capstan slip indication, with a test cartridge having a stationary capstan in place of the cartridge belt capstan;

applying a test torque to the drive roller of the tape drive;

monitoring for rotation of the drive roller; and designating the tape drive as defective if rotation of the drive roller is detected.

21. The method as in claim 20, further comprising designating the belt-driven tape cartridge as defective if rotation of the drive roller is not detected, wherein the belt-driven tape cartridge designated as defective is the belt-driven tape cartridge loaded in the tape drive at the time the imminent capstan slip indication was provided.

22. A tape drive for predicting capstan slip conditions during operation of a belt-driven tape cartridge, the tape cartridge having a rotatable belt capstan to impart motion to an elastomeric belt which moves the tape within the tape cartridge, comprising:

a drive motor coupled to rotate a drive capstan;

a drive roller, coupled to the drive capstan, having an elastomeric surface to engage the belt capstan, wherein a normal force of the drive roller against the belt capstan in view of an angular drive force of the belt capstan causes the belt capstan to rotate; and a processor configured and arranged to monitor a nominal tape velocity, and to provide an imminent capstan slip notification when the nominal tape velocity reaches a tape velocity threshold value corresponding to a relationship between the drive force and the normal force indicative of imminent, yet unencountered, capstan slip.

23. The tape drive as in claim 22, wherein the drive roller comprises an elastomeric cylinder coupled to the drive capstan along a longitudinal axis of the drive roller.

24. The tape drive as in claim 22, wherein the drive roller comprises:

a cylindrical core coupled to the drive capstan along a longitudinal axis of the cylindrical core; and an elastomeric covering affixed to a circumferential surface of the cylindrical core.

25. The tape drive as in claim 22, further comprising:

a light-emitting device positioned proximate the tape;

a signal transmitter coupled to the light-emitting device to transmit an enabling signal to the light-emitting device;

an optical sensor positioned proximate the tape opposite a side of the tape at which the light-emitting device is positioned;

a signal receiver coupled to the optical sensor to receive a trigger signal from the optical sensor when an opening on the tape passes between the optical sensor and the light-emitting device; and wherein the processor is further configured and arranged to monitor the nominal tape velocity by calculating a time interval in response to successive trigger signals corresponding to successive openings separated by known distance on the tape.

26. The tape drive as in claim 25, further comprising an oscillator having a predetermined clock period, wherein the processor calculates the time interval by totaling a number of the clock periods occurring between the successive trigger signals.

27. The tape drive as in claim 22, further comprising:

at least one servo track integral to the tape, wherein the servo track includes a plurality of pre-recorded pairs of servo sectors separated at known distances;

a read head capable of recognizing each of the servo sectors on the tape; and wherein the processor is coupled to the read head to continuously calculate time intervals between each of the servo sectors of the pre-recorded pairs.

28. The tape drive as in claim 27, further comprising an oscillator having a predetermined clock period, wherein the processor continuously calculates the time intervals by totaling a number of the clock periods occurring between each of the servo sectors of the pre-recorded pairs.

29. A test cartridge for use in detecting tape drive failures in a tape drive capable of operation with a belt-driven tape cartridge having a rotatable belt capstan, wherein the tape drive includes a drive roller coupled to a drive capstan rotatable by a drive motor, and wherein the test cartridge is inserted into the tape drive upon receipt of an imminent capstan slip indication, the test cartridge comprising:

a tape cartridge body capable of insertion into the tape drive;

a stationary test capstan coupled to the tape cartridge body having substantially equal dimensions, material, surface finish, and position as the belt capstan of a belt-driven tape cartridge, wherein the stationary test capstan remains immobile upon receiving a rotational force by the drive roller to indicate a tape drive failure if rotational motion of the drive capstan is detected.

* * * * *